United States Patent [19]
Allen

[11] 3,869,836
[45] Mar. 11, 1975

[54] MOBILE HOME PROTECTOR

[76] Inventor: Cloy L. Allen, Rt. 1, Box 1, Wingate, Tex. 79566

[22] Filed: Apr. 15, 1974

[21] Appl. No.: 460,880

[52] U.S. Cl............................ 52/23, 52/73, 52/90, 52/146, 52/295, 52/296
[51] Int. Cl............................................. E04n 9/14
[58] Field of Search............ 52/263, 23, 90, 93, 73, 52/86, 48, 146, 148; 248/361 A

[56] References Cited
UNITED STATES PATENTS

| | | | |
|---|---|---|---|
| 2,298,851 | 10/1942 | Wachter | 248/361 A |
| 2,353,017 | 7/1944 | Denton | 248/361 A |
| 2,692,033 | 10/1954 | Jaynes | 52/73 X |
| 2,871,997 | 2/1959 | Simpson | 52/93 |
| 3,019,861 | 2/1962 | Rasch | 52/93 |
| 3,242,620 | 3/1966 | Kaiser | 52/73 |
| 3,335,531 | 8/1967 | Grimelli | 52/23 |
| 3,599,379 | 8/1911 | Tuska | 248/361 R |
| 3,769,764 | 11/1973 | Young | 248/361 R |

*Primary Examiner*—John E. Murtagh
*Attorney, Agent, or Firm*—Arthur M. Sloan

[57] ABSTRACT

A canopy type structure presents a cover surface to protect the top of the mobile home from the weather and falling objects. The invention also provides exterior bracing of both sides of the mobile home roof and rigid anchors set in the ground to hold the mobile home in fixed position.

11 Claims, 8 Drawing Figures

MOBILE HOME PROTECTOR

The invention relates to a canopy type structure to provide protection to the roof of a mobile home from the weather and falling objects. The invention also provides exterior bracing of both sides of the mobile home roof and rigid anchors set in the ground to hold the mobile home in fixed position.

Chains, cables, or rods are passed over the roof of the mobile home perpendicular to its length and under the trusses and the chain ends are secured to the uprights which sustain such trusses.

The canopy of the mobile home protector keeps sun, hail, snow, sleet, rain, and falling objects from the roof of the mobile home, and protects the mobile home from lightning.

Cemented pier holes provide the rigid anchors needed to hold the mobile home protector frame in a fixed position on the pier type foundation.

The exterior bracing provided by the chains, cables, or rods which are passed over the mobile home roof protects the mobile home during high winds and prevents a break down of the internal or built in bracing of the mobile home.

Accordingly it is an object of the subject invention to provide a mobile home protector that protects the roof of a mobile home from the weather and falling objects.

Another object of the subject invention is to provide a mobile home protector that furnishes exterior bracing of both sides of the mobile home roof.

An additional object of the subject invention is to provide a mobile home protector that anchors the mobile home in a fixed position.

Yet another object of the subject invention is to provide a mobile home protector that keeps sun, hail, snow, sleet, rain, and falling objects from the roof of the mobile home.

A further object of the subject invention is to provide a mobile home protector that protects the mobile home from high winds.

Still another object of the subject invention is to provide a mobile home protector that prevents a break down of the internal or built in bracing of the mobile home.

An additional object of the subject invention is to provide a canopy type mobile home protector that reduces a mobile home's roof temperature during the warm or hot weather that may occur periodically.

Other objects and advantages of the subject invention will be apparent from the following description of the invention taken in connection with the accompanying drawings in which.

Figure 1:
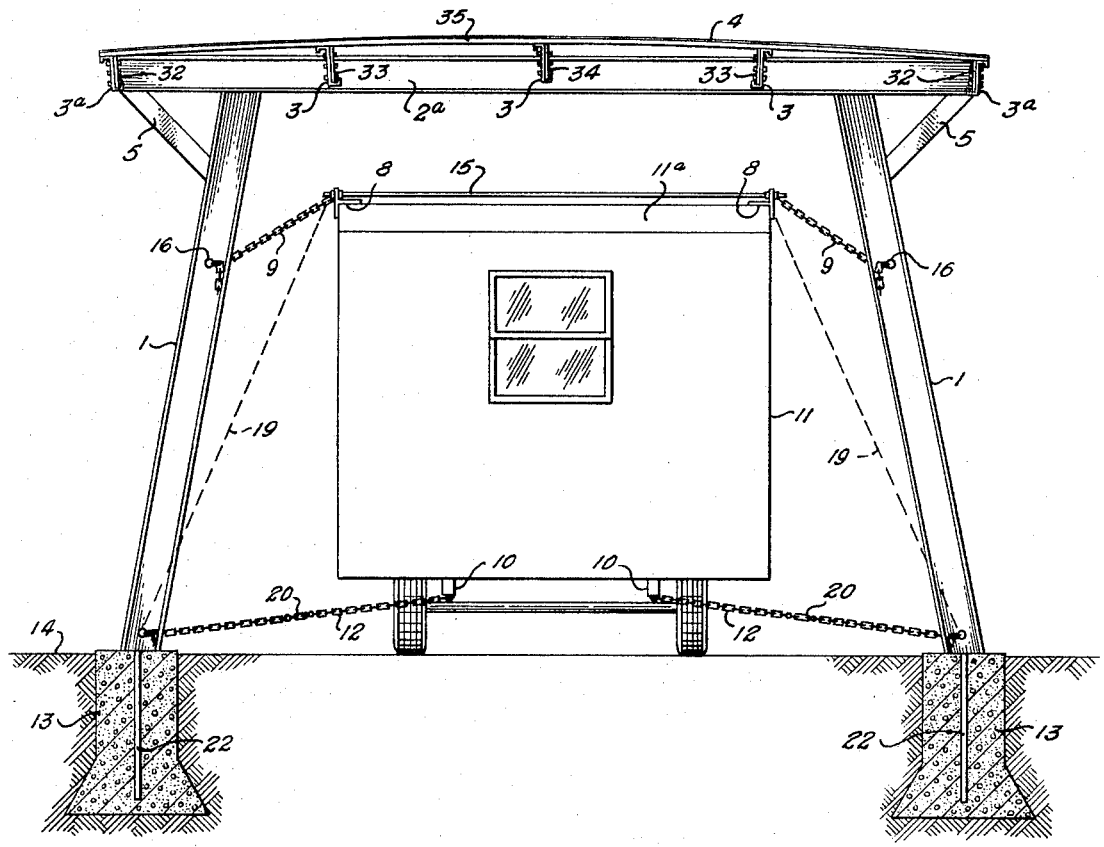
FIG. 1 is an end view of one embodiment of the mobile home protector of the subject invention with a mobile home in place.
Figure 3:
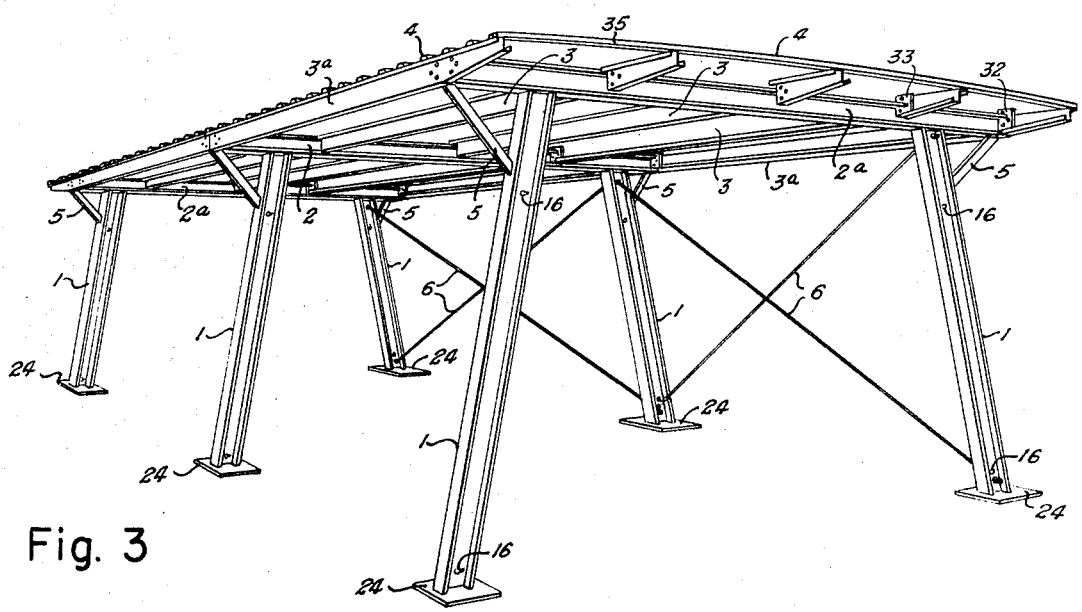
FIG. 3 is a perspective view of one embodiment of the mobile home protector of the subject invention without a mobile home in place.
Figure 2:
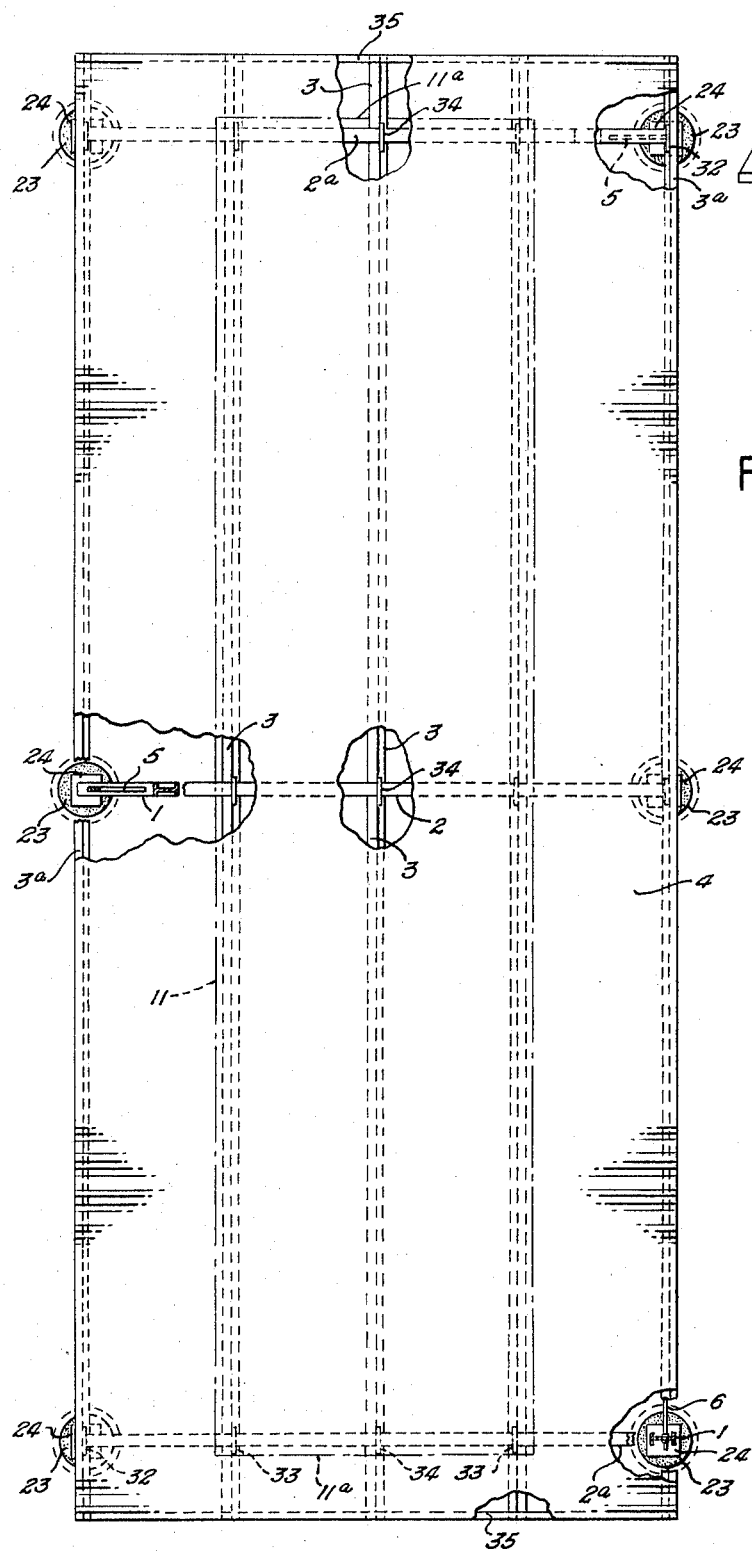
FIG. 2 is a top view of one embodiment of the mobile home protector of the subject invention with a mobile home in place and the canopy cut away to show the exterior bracing of the mobile home roof and the arrangement of trusses and purlins.
Figure 4:
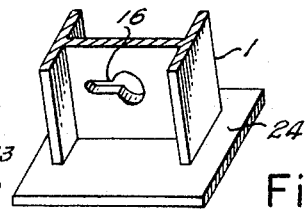
FIG. 4 is a view of a chain slot in a beam.

In the drawings the uprights 1 are shown supporting the trusses 2, and the purlins 3 are supported by the trusses 2.

The canopy roof 4 is supported on the purlins 3 with the various purlins 3 having the necessary elevation above the trusses 2 to give the canopy roof 4 the desired pitch or slope, such as one-half inch per foot.

Support brackets 5 are connected between the uprights 1 and the end purlins 3a to give additional support to the roof 4 overhang.

Side braces 6 are provided for squaring up the uprights 1 and for further support to the structure of the mobile home protector.

Roof braces 15 are connected to the uprights 1 by means of Ts 8 and chains 9.

The underframe 10 of the mobile home 11 is anchored to the uprights 1 by means of chains 12.

The uprights 1 are fixed to piers 13 which are set below ground level 14.

Proceeding through the structure of the subject invention in more detail the trusses 2 are preferably no more than 20 feet apart, and they may be welded or bolted to the uprights 1 or both welded and bolted.

The dimensions of the mobile home protector are such that the end trusses 2a are placed directly over the ends 11a of the mobile home 11 with the other trusses 2 being equally spaced between the end trusses 2a.

Since most mobile homes are made in multiples of 10 feet, a 60 ft. unit would require four trusses, ideally, and an 80 ft. unit would require five trusses ideally.

A minimum of 2 feet clearance between the mobile home roof and the roof 4 of the mobile home protector should be provided to allow free airflow, reduce heat radiation and facilitate placement or removal of the mobile home from the mobile home protector. To facilitate placement or removal of the mobile home from the mobile home protector a minimum of 2 feet clearance should also be left between the sides of the mobile home and the uprights or side trusses 1 of the mobile home protector.

The edges of roof 4 should extend approximately 2 feet beyond the uprights 1 on all sides of the mobile home protector to provide the needed protection and shade.

Figure 5:
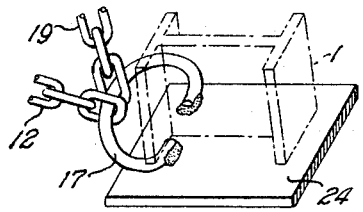
FIG. 5 is a view of a chain hook welded to a plate.
Figure 6:
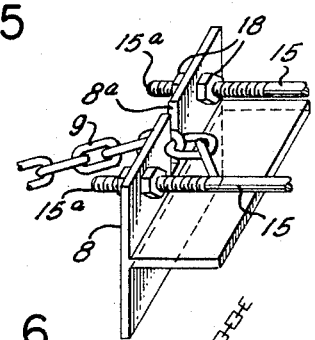
FIG. 6 is an end view of a "T" which may be used for exterior roof bracing adjustment and attachment.
Figure 7:
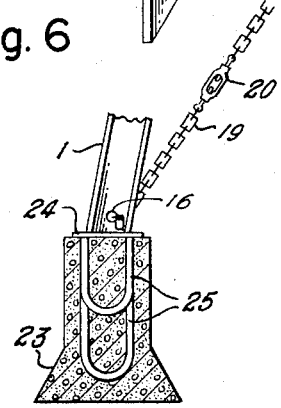
FIG. 7 is a view of one alternate form of pier.

To obtain the necessary bracing for the mobile home roof 4, T shaped adapters 8 are connected in pairs across the roof 4 with two galvanized or other suitable rods, cables, or chains, such as galvanized rods 15 which may be ½ inch rods. The adapters 8 may be secured to the mobile home by bolts by the manufacturer at the time the mobile home is constructed in which case the rods 15 might be dispensed with. The adapters 8 are secured to the opposite uprights or side trusses 1 by the chains 9 which may be ⅜ inch galvanized chain. One end of the chains 9 is locked in a chain slot 8a in the adapter 8, and the other end of the chains 9 is fixed to the opposite upright 1 by locking in a chain slot 16 in the upright 1 or chains 19 may be fixed to plate 24 by being attached by a grab hook or a U shaped rod 17 placed around the I of I-beam upright 1 and welded to plate 24 or by other suitable means such as two lengths of chain connected by a turnbuckle 20 as indicated in FIG. 7. In the embodiment of FIG. 5 the uprights 1 may be dispensed with as indicated by stipled lines, if no canopy is desired. The uprights 1 may be I-beams or beams of other suitable shape. The rods 15 are end threaded at 15a with nuts 18 to adjust to the roof 4 width. The chain slots 16 or chain hooks 17 in or around the uprights 1 must be at least 1 foot lower than the roof 4 to give added downward pull when side movement is exerted by any force. The chains 9 may be connected to the piers 13 as indicated by stippled lines 19 instead of to the uprights 1.

The piers 13 for the anchoring of the mobile home and the support of the uprights or side trusses 1 must be of sufficient size in diameter and depth for the type of soil in which they are located. Regardless of the diameter or depth, the piers must be bell shaped at the bottom to assure maximum holding qualities.

FIG. 1 shows concrete piers 13 with rod reinforcement 22 to which the uprights or side trusses are fixed.

FIG. 7 shows concrete pier 23 including plate 24 which is welded to the upright 1 and to two U-shaped reinforcement rods 25 which are embedded in the concrete.

Figure 8:
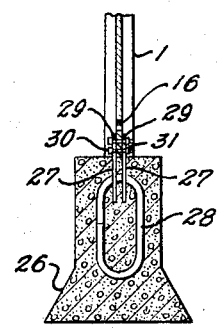
FIG. 8 is a view of another alternate form of pier.

FIG. 8 shows concrete pier 26 including plates 27 secured in the concrete by reinforcement rod loops 28 through holes in the lower portion of the plates 27. Holes 29 in the top portion of the plates 27 are used for bolting the uprights 1 between the plates 27 by means of bolts 30 and nuts 31. In the case of I-beam uprights the bolting is conveniently through the webb of the I-beam.

The trusses 2 may be standard I-beams, sometimes called prefabs, with straight or tapered webs of sufficient size and weight to be able to handle the load stresses the mobile home protector might be subjected to.

Suitable plates 32, 33, and 34 are welded or otherwise appropriately fixed to the trusses 2 at equally spaced intervals normally no more than 5 feet. The outside plates 32 are set level with the truss beam 2 top edge, the plates 33 are raised, e.g., 2 inches, above the top edge of the truss beam 2, and the center plates are raised, e.g. 4 inches, above the top edge of the truss beam 2.

The purlins 3 are bolted or otherwise appropriately fixed to the plates 32, 33, and 34. The roof 4 which may be 26 gauge steel or other appropriate material is laid and appropriately fixed across the top of the purlins 3. The elevations of the plates 32, 33, and 34 above the top edge of the respective beams 2 determines the pitch of the roof 4, and such elevations are selected to achieve the desired pitch of the roof 4 which would be one-half inch per foot (12×½ inch) per the above noted example plate elevations.

Square tubing 35 or other suitable material may be bolted or otherwise fixed at the top of the tapered ends of the end or side purlins 3a and the other purlins 3 to provide support reinforcement for the edge of the roof 4. The tubing 35 fits under the valley of a corrugation of corrugated roofing material or under a diamond rib of diamond ribbed roofing material.

Purlins 3 can be metal Z-bars or C-channels or other structural material of sufficient gauge and may be predrilled with holes to match predrilled holes in the plates 32, 33, and 34 for purposes of bolting the purlins 3 to the plates 32, 33, and 34 and the ends of purlins 3 and 3a may also be predrilled with holes for bolting reinforcement tubing 35.

The uprights 1 can be secured to the trusses 2 by welding the uprights 1 directly to the trusses 2 or by bolting or by other appropriate means such as bolting of the trusses 2 through plates welded to an i-beam truss and arranged to slide down over the webb of an upright 1 I-beam or plates welded to the top of an upright 1 and bolted to a truss 2.

As noted to facilitate squaring of the uprights 1, bracing or braces 6 which may be made from ⅝ inch rod or cable with threaded ends are provided along one side of the mobile home protector and the mobile home is positioned in the mobile home protector so that the bracing is opposite the side of the mobile home in which the main entrance is not located so as not to block the main entrance. Threaded holes may be positioned near the lower and upper ends of the uprights 1 to receive the threaded ends of the bracings 6. The braces 6 may be connected to the uprights by any suitable means. Once the braced side of the mobile home protector is squared the roof portion of the mobile home protector is squared by applying a force, right or left as required, to the other side of the mobile home protector until the roofing is applied.

Although any suitable roofing material may be used in the invention, galvanized, plain or painted, steel full length of 26 gauge is especially suitable. One roofing material that has been used is 26 gauge diamond ribbed bonderized acrylate finished steel. Due to the added stress a one-half inch per foot pitch gives the roofing material, if such pitch is used, a 29 gauge metal may suffice in regions where snow is no problem.

Preferably trusses and purlins should be primed for painting to the color desired by the mobile home owner.

Roofing 4 may be attached to the purlins 3 by self drills with neoprene seals applied with a variable speed electric drill. One suitable spacing of self drills would be 6 inches on the side purlins and 12 inches on the remaining purlins although any suitable spacing of self drills may be used.

Various items may be attached to the mobile home protector for functional or aesthetic purposes such as car ports, canopies, trellises, etc.

Units designed for bolting may be readily assembled and disassembled by a handyman mobile home owner. A welded unit is more permanent and normally offers more strength than a bolted unit.

In one embodiment of the invention the purlins, trusses, and mobile home protector roof are omitted resulting in a structure affording no protection from sun, rain, snow, sleet, or hail but providing for bracing the roof of the mobile home and anchoring the mobile home frame.

What I claim as my invention and desire to secure by Letters patent of the United States is:

1. A mobile home protector including uprights, trusses connected to oppositely disposed uprights near the upper ends of the uprights, purlins supported by the trusses, plates for connecting the purlins to the trusses and supporting the purlins the desired elevation above the trusses, roofing material supported by the purlins and connected to the purlins so as to give the roof a pitch determined by the elevation of the purlins above the trusses, a bell shaped, reinforced concrete pier for each upright, means for connecting each upright to its associated pier, each pier being adapted for placement in the ground with the top of the pier at ground level, and means for bracing a mobile home roof said bracing means comprising chains, one chain connected to each upright below the level of the mobile home roof to be braced, adapters set on the side edge of the mobile home roof to be braced opposite each upright, and connecting elements wherein the free end of each chain not connected to the upright is locked in the adapter opposite said upright.

2. A mobile home protector as described in claim 1 including connecting elements in which each adapter adjustably connects two connecting elements to its oppositely disposed adapter on the other side edge of the mobile home roof.

3. A mobile home protector as described in claim 1 including means for anchoring the frame of a mobile home comprising chains, one chain connected at one of its ends near the lower end of each upright and at its other end to the frame of a mobile home.

4. A mobile home protector as described in claim 3 including two braces which cross each other set between each two uprights on one side of the mobile home protector for squaring the uprights.

5. A mobile home protector as described in claim 4 in which the mobile home protector roof's edge extends beyond the uprights on all sides to provide additional protection and shade for a mobile home to be protected.

6. A mobile home protector as described in claim 5 including multiple elements connected between the edge of the mobile home protector roof and each upright to provide additional support for the mobile home protector roof.

7. A mobile home protector as described in claim 6 including elements connected between the top end of each purlin and the roof to provide additional reinforcement support.

8. A mobile home protector as described in claim 7 in which the trusses are no more than 20 feet apart, the purlins are no more than 5 feet apart, and the height of the mobile home protector roof is at least 2 feet above the mobile home to be protected.

9. A mobile home protector as described in claim 8 including metal plates one fixed to reinforcement in each pier and wherein each upright is connected to its associated pier by attachment to the metal plate.

10. A mobile home protector as described in claim 8 wherein each upright is connected to its associated pier by attachment to reinforcement protruding from the pier.

11. A mobile home protector including uprights, trusses connected to oppositely disposed uprights near the upper ends of the uprights, purlins supported by the trusses, plates for connecting the purlins to the trusses and supporting the purlins the desired elevation above the trusses, roofing material supported by the purlins and connected to the purlins so as to give the roof a pitch determined by the elevation of the purlins above the trusses, a bell shaped, reinforced concrete pier for each upright, means for connecting each upright to its associated pier, each pier being adapted for placement in the ground with the top of the pier at ground level, and means for bracing a mobile home roof said bracing means comprising chains, one chain connected to each pier, adapters set on the side edge of the mobile home roof to be braced opposite each pier wherein the free end of each chain not connected to the pier is locked in the adapter opposite said pier.

* * * * *